US008521670B2

(12) United States Patent
Paguio

(10) Patent No.: US 8,521,670 B2
(45) Date of Patent: Aug. 27, 2013

(54) ARTIFICIAL NEURAL NETWORK APPLICATION FOR MAGNETIC CORE WIDTH PREDICTION AND MODELING FOR MAGNETIC DISK DRIVE MANUFACTURE

(75) Inventor: Hernan J. S. Paguio, Laguna (PH)

(73) Assignee: HGST Netherlands B.V., Amsterdam (NL)

( * ) Notice: Subject to any disclaimer, the term of this patent is extended or adjusted under 35 U.S.C. 154(b) by 280 days.

(21) Appl. No.: 13/115,884

(22) Filed: May 25, 2011

(65) Prior Publication Data
US 2012/0303562 A1 Nov. 29, 2012

(51) Int. Cl.
*G06N 3/02* (2006.01)
(52) U.S. Cl.
USPC ............................................. 706/19; 706/45
(58) Field of Classification Search
USPC ..................................................... 706/19, 45
See application file for complete search history.

(56) References Cited

U.S. PATENT DOCUMENTS

| | | | |
|---|---|---|---|
| 5,111,531 A | 5/1992 | Grayson et al. | |
| 5,282,261 A | 1/1994 | Skeirik | |
| 6,384,995 B1 | 5/2002 | Smith | |
| 6,574,754 B1 | 6/2003 | Smith | |
| 7,486,464 B2 | 2/2009 | Saliba | |
| 2010/0082126 A1 | 4/2010 | Matsushita | |

FOREIGN PATENT DOCUMENTS

JP 5035709 A 2/1993

OTHER PUBLICATIONS

Jung, et al., Comparison of Experiment and Simulation Results of Interlayer Thickness Effect in Perpendicular Recording Media, IEEE Transactions on Magnetics, vol. 46, No. 6, Jun. 2010, pp. 1825-1828.*
Fok et al., "Using a neural-fuzzy approach for improving the perpendicular magnetic recording head manufacturing process," © 2010 Inderscience Enterprises Ltd., Int. J. Intelligent Information and Database Systems, vol. 4, No. 5, 2010, pp. 413-430.
Nussbaum et al., "Neural Networks for the Prediction of Magnetic Transformer Core Characteristics," © 2000 IEEE< IEEE Transactions on Magnetics, vol. 36, No. 1, Jan. 2000, pp. 313-329.
Apte et al., "Predicting Defects in Disk Drive Manufacturing: A Case Study in High-Dimensional Classification," IEEE Annual Conference on AI Applications, CAIA-93, Mar. 1993, 8 pages.
Kanarkard et al., "Data Mining to Recognize Fail Parts in Manufacturing Process," ECTI Transactions on Electrical Engineering, Electronics, and Communications, vol. 7, No. 2, Aug. 2009, pp. 122-127.
Apte et al., "Case Studies in High-Dimensional Classification," © 1994 Kluwer Academic Publishers, Boston, Journal of Applied Intelligence, vol. 4, 1994, pp. 269-281.
Rutledge et al., "Paper 134-25: Data Warehousing for Manufacturing Yield Improvement," IBM Storage Technology Division, San Jose, CA, Data Warehousing,10 pages.

(Continued)

*Primary Examiner* — Wilbert L Starks
(74) *Attorney, Agent, or Firm* — Zilka-Kotab, PC

(57) ABSTRACT

A method for predicting and optimizing magnetic core width of a write head using neural networks to analyze manufacturing parameters, and determining new manufacturing parameters that will provide more optimal magnetic core width results. The manufacturing parameters can include: write pole flare point; wrap around shield dimension; and side gap dimension.

20 Claims, 28 Drawing Sheets

(56) References Cited

OTHER PUBLICATIONS

Sieger et al., "An Artificial Neural Network Case Study: Prediction Versus Classification in a Manufacturing Application," © 1993 Pergamon Press Ltd., Computers and Industrial Engineering, vol. 25, Nos. 1-4, pp. 381-384, 1993.

Johnston et al., "Downstream Performance Prediction for a Manufacturing System Using Neural Networks and a Six Sigma Improvement Techniques," © 2008 Elsevier Ltd., Robotics and Computer-Integrated Manufacturing 25, 2009, pp. 513-521.

Dezelak et al., "Artificial Neural Network Applied for Detection of Magnetization Level in the Magnetic Core of a Welding Transformer," © 2010 IEEE, IEEE Transactions on Magnetics, vol. 46, No. 2, Feb. 2010, pp. 634-637.

Tsang et al., "Development of a Data Mining System for Continual Process Quality Improvement," © IMechE 2007, Proc. IMechE, vol. 221, Part B: J. Engineering Manufacture, Special Issue Paper, pp. 179-193.

Paguio, "Artificial Neural Network Application for MCW Prediction & Modeling," A Thesis Paper Presented to the Faculty of the Graduate School of Electronics & Communications Engineering, College of Engineering, De La Salle University—Manila, Aug. 2010, pp. 1-77.

* cited by examiner

| Parameter Name | Data Type | Classification |
|---|---|---|
| Overlay_1 | Continuous | Predictor |
| Overlay_2 | Continuous | Predictor |
| R/W Offset | Continuous | Predictor |
| Final SH | Continuous | Predictor |
| MCW | Continuous | Target |

*Table 1.* Parameter Data Details.

FIG. 19

| Overlay_1 | Overlay_2 | R/W Offset | Final SH | MCW |
|---|---|---|---|---|
| -67.77 | 45.65 | 566.31 | 70.42 | 94.30 |
| -67.35 | 43.64 | 586.48 | 71.39 | 112.70 |
| -69.65 | 38.52 | 584.94 | 69.33 | 95.00 |
| -69.63 | 40.73 | 573.02 | 68.71 | 106.80 |
| -70.44 | 35.98 | 582.68 | 69.86 | 85.80 |
| -70.14 | 38.04 | 586.33 | 71.04 | 94.00 |
| -69.83 | 40.09 | 577.48 | 71.15 | 97.80 |
| -69.82 | 34.60 | 625.82 | 71.94 | 102.30 |
| -70.62 | 37.55 | 586.29 | 69.85 | 109.90 |
| -69.91 | 35.38 | 602.14 | 71.07 | 97.50 |
| -71.21 | 35.65 | 545.70 | 70.49 | 121.60 |
| -72.02 | 30.90 | 581.61 | 69.70 | 83.90 |
| -71.41 | 35.01 | 492.65 | 69.32 | 110.80 |
| -72.11 | 31.69 | 588.43 | 70.20 | 117.50 |
| -72.61 | 29.00 | 582.03 | 70.63 | 91.10 |
| -72.30 | 31.05 | 594.88 | 69.86 | 101.10 |
| -72.00 | 33.11 | 584.48 | 70.21 | 99.80 |
| -71.60 | 28.88 | 590.80 | 71.80 | 105.40 |
| -72.39 | 31.84 | 589.11 | 70.48 | 103.10 |
| -71.49 | 30.30 | 589.34 | 70.54 | 109.60 |
| -73.29 | 27.88 | 612.16 | 70.56 | 103.20 |
| -72.98 | 29.93 | 597.55 | 70.10 | 113.80 |
| -72.38 | 26.34 | 613.37 | 69.99 | 108.10 |
| -72.08 | 28.40 | 606.86 | 68.95 | 119.40 |
| -72.58 | 25.71 | 609.36 | 68.08 | 123.70 |
| -73.77 | 27.39 | 763.41 | 69.63 | 117.10 |
| -72.87 | 25.86 | 573.72 | 70.95 | 123.10 |
| -74.47 | 24.07 | 593.72 | 70.24 | 131.60 |
| -73.46 | 23.95 | 606.04 | 68.81 | 136.50 |
| -74.96 | 23.58 | 611.47 | 66.80 | 124.60 |

FIG. 22

| User Input | Trial 1 | Trial 2 | Trial 3 |
|---|---|---|---|
| Number of network layers | 4 | 3 | 3 |
| Number of neurons | 20 | 20 | Auto |
| Auto Hidden Layer Optimization | N | N | Y |
| Min Layer | n/a | n/a | 2 |
| Max Layer | n/a | n/a | 30 |
| Step Layer | n/a | n/a | 1 |
| Max Step w/o Change | n/a | n/a | 8 |
| Overfitting & Detection | Y | Y | Y |
| % Training rows to hold out | 20 | 20 | 20 |
| Max. Steps w/o cahnge | 10 | 10 | 10 |
| Number of convergence tries | 50 | 50 | 50 |
| Convergence tolerance | 0.00001 | 0.00001 | 0.00001 |
| Maximum iterations | 10000 | 10000 | 10000 |
| Iterations without improvement | 500 | 500 | 500 |
| Minimum improvement delta | 0.000001 | 0.000001 | 0.000001 |
| Min. gradient | 0.000001 | 0.000001 | 0.000001 |
| Max. minutes execution time | infinite | infinite | infinite |

FIG. 23

| User Input | Trial 2 | Trial A | Trial B | Trial C | Trial D | Trial E | Trial F | Trial G | Trial H |
|---|---|---|---|---|---|---|---|---|---|
| Number of network layers | 3 | 3 | 3 | 3 | 3 | 3 | 3 | 3 | 3 |
| Number of neurons | 20 | 20 | 20 | 20 | 20 | 20 | 20 | 20 | 20 |
| Auto Hidden Layer Optimization | N | N | N | N | N | N | N | N | N |
| Min Layer | n/a | n/a | n/a | n/a | n/a | n/a | n/a | n/a | n/a |
| Max Layer | n/a | n/a | n/a | n/a | n/a | n/a | n/a | n/a | n/a |
| Step Layer | n/a | n/a | n/a | n/a | n/a | n/a | n/a | n/a | n/a |
| Max Step w/o Change | n/a | n/a | n/a | n/a | n/a | n/a | n/a | n/a | n/a |
| Overfitting detection | Y | Y | Y | Y | Y | Y | Y | Y | Y |
| % Training rows to hold out | 20 | 20 | 20 | 20 | 20 | 20 | 20 | 20 | 20 |
| Max. Steps w/o change | 10 | 10 | 10 | 10 | 250 | 500 | 1000 | 500 | 500 |
| Number of convergence tries | 50 | 50 | 50 | 1000 | 50 | 50 | 250 | 100 | 300 |
| Convergence tolerance | 0.00001 | 0.00001 | 0.001 | 0.00001 | 0.00001 | 0.00001 | 0.00001 | 0.00001 | 0.00001 |
| Maximum iterations | 10,000 | 10,000 | 10,000 | 10,000 | 10,000 | 10,000 | 10,000 | 100,000 | 1,000,000 |
| Iterations without improvement | 500 | 500 | 500 | 500 | 500 | 500 | 500 | 10,000 | 200,000 |
| Minimum improvement delta | 0.000001 | 1E-08 | 0.000001 | 0.000001 | 0.000001 | 0.000001 | 0.000001 | 0.000001 | 0.000001 |
| Min. gradient | 0.000001 | 1E-08 | 0.000001 | 0.000001 | 0.000001 | 0.000001 | 0.000001 | 0.000001 | 0.000001 |
| Max. minutes execution time | infinite | infinite | infinite | infinite | infinite | infinite | infinite | infinite | infinite |

*Table 4. Step 2 Detailed MLP Parameter settings*

FIG. 24

ARTIFICIAL NEURAL NETWORK APPLICATION FOR MAGNETIC CORE WIDTH PREDICTION AND MODELING FOR MAGNETIC DISK DRIVE MANUFACTURE

FIELD OF THE INVENTION

The present invention relates to perpendicular magnetic data recording, and more particularly to a method of using artificial neural networks to predict magnetic core width of a magnetic head for use in a magnetic data recording system.

BACKGROUND OF THE INVENTION

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresistive (TMR) sensor can be employed to read a magnetic signal from the magnetic media. The electrical resistance of the sensor changes in response to a magnetic field, such as from a magnetic medium, and this change in resistance can be detected as a magnetic signal from the magnetic media.

One parameter that is of great importance to the performance of a magnetic disk drive system is the magnetic core width of the write head. The magnetic core width determines the width of a magnetic bit recorded by the write pole of the write head. The smaller the magnetic core width, the greater the number of tracks of data that can be written to the media. Therefore, the magnetic core width is an important factor to the data density of the magnetic recording system.

Magnetic data recording system are designed to have a specific magnetic core width, and manufacturing processes are set up to achieve as close as possible, this design designated magnetic core width. However, certain process variations and deviations make it difficult to impossible to achieve this magnetic core width in 100% of the heads manufactured. Magnetic heads that do not meet the required design requirements for magnetic core width must be scrapped, leading to great waste and expense. Therefore, there is a need for processes that can predict magnetic core width as reliably as possible, and which can allow manufacturing parameters to be adjusted to minimize the number of heads that must be scrapped.

SUMMARY OF THE INVENTION

The present invention provides a method for manufacturing magnetic heads for magnetic data recording that includes: collecting data regarding manufacturing parameters; constructing a neural network; analyzing the data using the neural network to produce an output from the neural network; and using the output from the neural network to optimize a magnetic core width of a magnetic write head.

The invention can be embodied on computer readable medium comprising instructions for: collecting data regarding manufacturing parameters; constructing a neural network; analyzing the data using the neural network to produce an output from the neural network; and using the output from the neural network to provide new manufacturing parameters for optimizing a magnetic core width of a write head.

This method advantageously allows the magnetic core width of magnetic write heads manufactured on a wafer to be predicted and optimized prior to finished manufacture and prior to assembling the heads onto suspension assemblies and testing on a dynamic testing tool This saves great expense and time by allowing the magnetic core width to be optimized early in the manufacturing process.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 19 is a table of input and output data details for data used in an Artificial Neural Network for calculating a magnetic core width;

FIG. 22 is a table of data used in calculating magnetic core width;

FIGS. 23 and 24 are tables of Multi-Layer Perceptron settings;

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
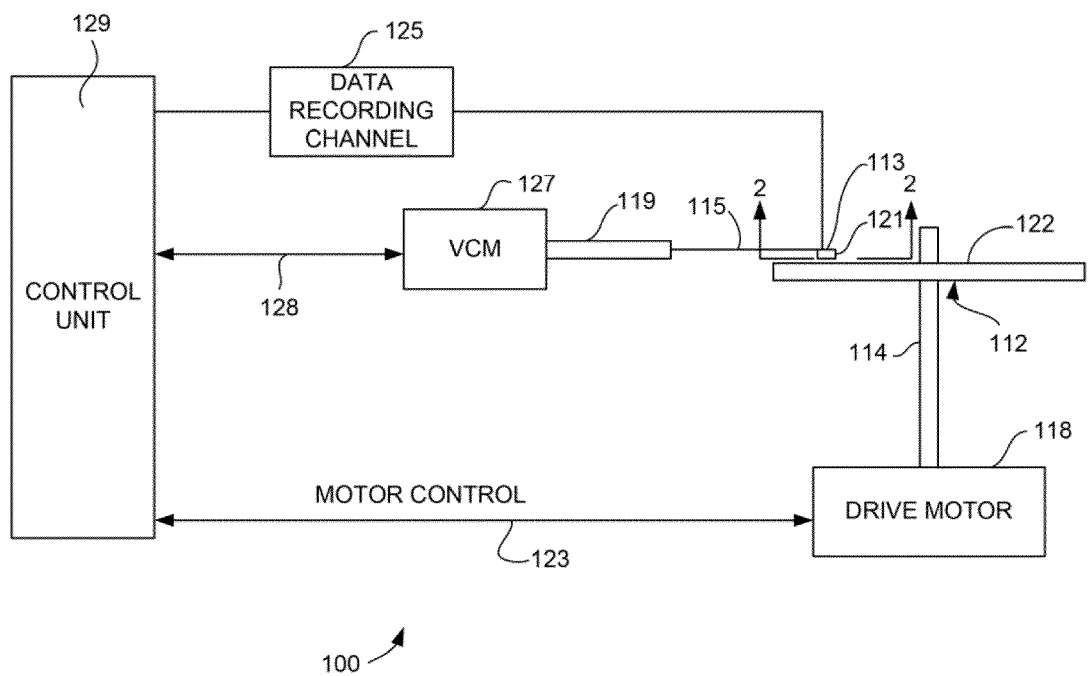
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
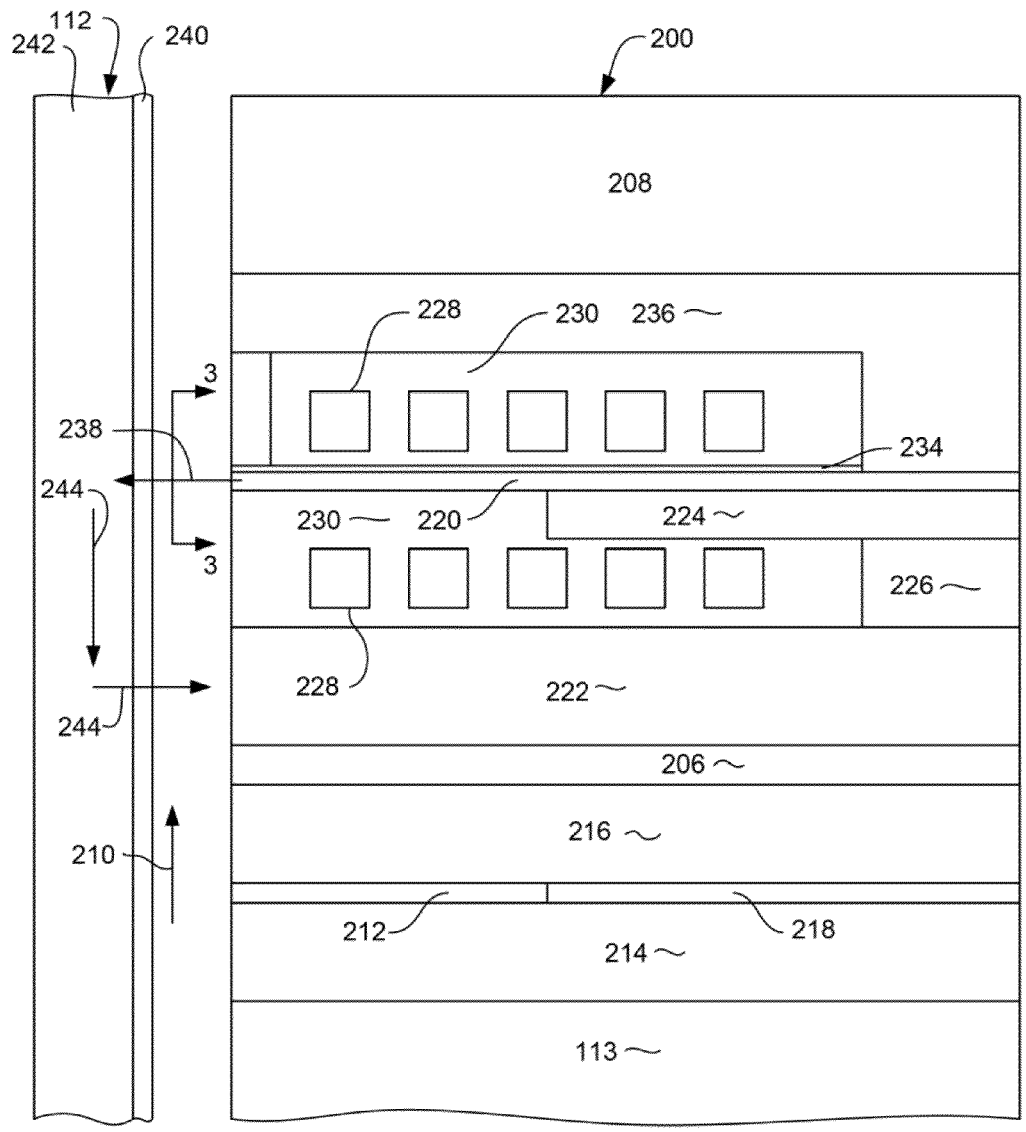
FIG. 2 is a side cross sectional view of a magnetic head and a portion of an adjacent magnetic media.

FIG. 2 shows a side cross sectional view of a magnetic head 121. The magnetic head includes a read head portion 202 and a write head portion 204, both of which are formed on a substrate that can be the body of the slider 113 (FIG. 1). The read head portion 202 and write head portion 204 can be separated from one another by a non-magnetic, dielectric layer 206 such as alumina. Also, a protective layer 208 such as alumina can be formed over the write head portion 204. Arrow 210 indicates the direction of travel of the magnetic disk 112 relative to the head 200 during operation.

The read head portion 202 can include a magnetoresistive sensor 212 that can be sandwiched between first and second magnetic shields 214, 216 that can be constructed of an electrically conductive material so that they can also function as electrically conductive leads to conduct a sense current to the sensor 212. The space between the leads 214, 216 can be filled with a non-magnetic, electrically insulating material 218 such as alumina.

With continued reference to FIG. 2, the write head 204 includes a magnetic write pole 220 that extends to the air bearing surface (ABS) and a magnetic return pole 222 that also extends to the ABS. The write pole 220 can be connected with a magnetic shaping layer 224 that helps to conduct magnetic flux to the write pole. The write pole and shaping layer 220, 224 can be connected with the return pole 222 in a region removed from the ABS by a magnetic back gap layer 226.

The write head 204 also includes a write coil 228 the turns of which pass between the write pole and shaping layer 220, 224 and the return pole 222. The write coil 228 may also pass above the write pole 220 as shown in FIG. 2. The write coil 228 can be constructed of a non-magnetic, electrically conductive material such as Cu and can be surrounded by a non-magnetic, dielectric material 230 such as alumina. The write head 204 can also include a trailing magnetic shield 232 that is located at the ABS and is separated from the write pole 220 by a non-magnetic trailing gap layer 234. The trailing shield 232 can be connected with a trailing return pole 236 that is also connected with the other magnetic structures of the write head 204 at the back of the write head 204 away from the ABS. The presence of the trailing magnetic shield helps to increase the field gradient of magnetic write field from the write pole.

When a current flows through the coil 228 a resulting magnetic field emitted from the coil results in a magnetic flux flowing through the magnetic structures 222, 226, 224, 220 of the write head 204. This in turn causes a magnetic write field to be emitted from the tip of the write pole 220 as indicated by arrow 238. The magnetic media 112 has a magnetically hard top layer 240 and a magnetically soft under-layer 242. The write field emitting from the write pole 238 locally magnetizes the magnetically hard top layer 240, which remains magnetized. The magnetic flux then flows through the magnetically soft under-layer 242 to return to the return pole as indicated by arrow 244. Because the return pole 222 has a much larger cross section at the ABS than the write pole 220, the magnetic field is sufficiently spread out and weak that it does not erase the previously recorded data from the hard magnetic layer 240.

Figure 5:
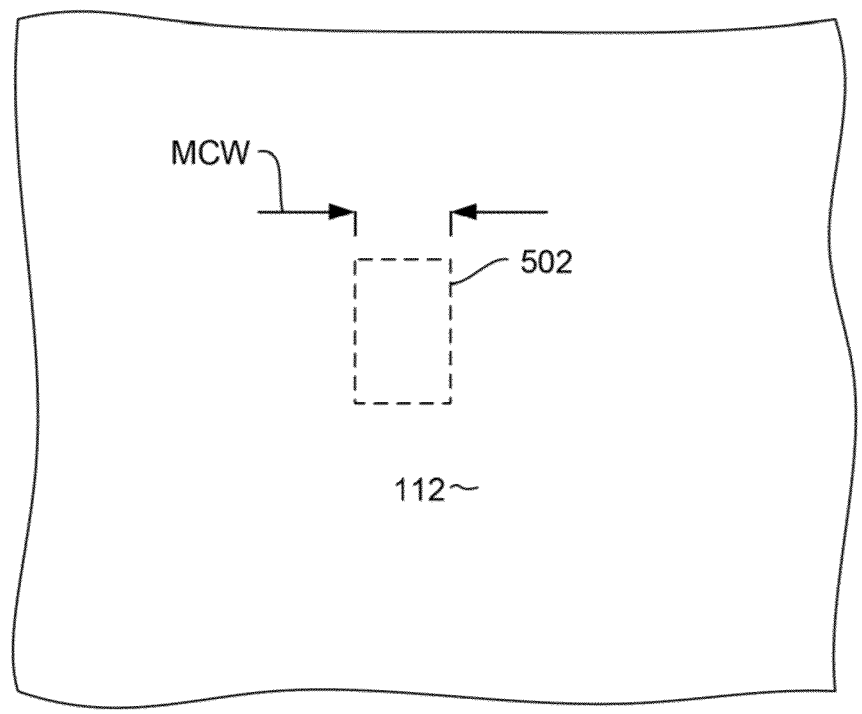
FIG. 5 is a view of a portion of a surface of a magnetic media illustrating a magnetic core width of a bit of data recorded thereon.

FIG. 5 shows a view of the surface of the media 112 adjacent to the write pole. When the write field from the write pole 220 locally magnetizes the media it creates a magnetic bit represented by dashed line 502. This magnetic bit has a width that defines a magnetic core width (MCW). This magnetic core width is an important parameter to the magnetic recording system, because it determines, to a large extend, the spacing of tracks on the disk and, therefore, determines the amount of data (areal density) of data that can be recorded to the media 112.

Figure 3:
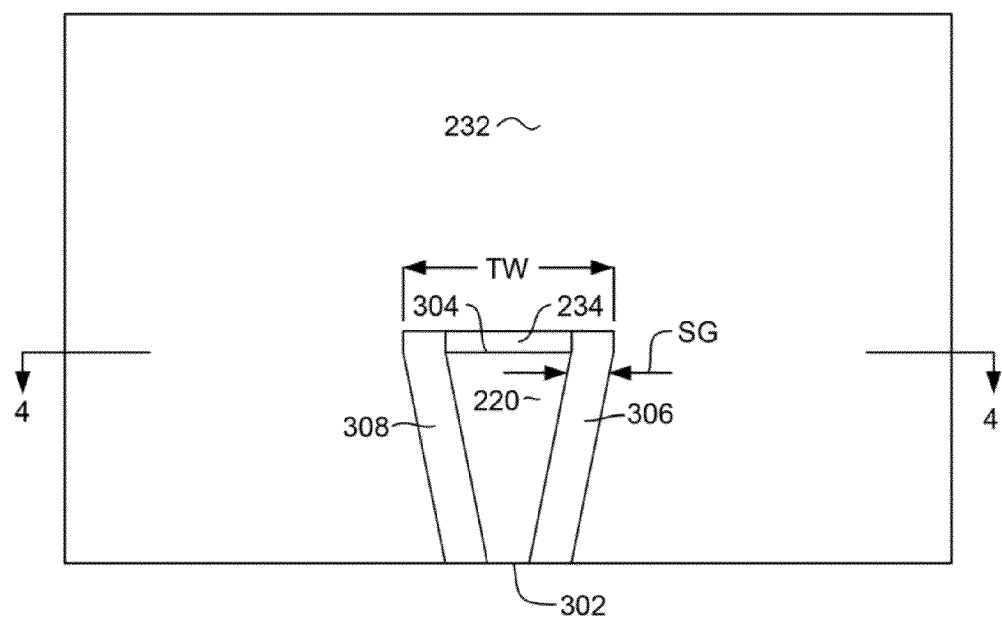
FIG. 3, is an ABS view of a portion of the magnetic head of FIG. 2 as seen from line 3-3 of FIG. 2.

FIG. 3 shows an enlarged ABS view of a portion of the head 200 as seen from line 3-3 of FIG. 2. In FIG. 3 it can be seen that the tip of the write pole 220 has tapered sides that give it at trapezoidal shape. The write pole 220 has a lead edge 302 and a trailing edge 304. As the width of the write pole 220 becomes very small, the leading edge 302 can come to a point so that the write pole 220 resembles a triangle rather than a trapezoid as shown. The width of the trailing edge 304 of the write pole 302 defines the track width TW of the write head 204. The tapered shape discussed above and shown in FIG. 3 helps to prevent the write pole 302 from writing to adjacent tracks of data as a result of skew of the head. The term "skew" relates to the effect of the head being at an angle relative to the data track when the actuator pivots to locate the head at innermost or outermost tracks of data on the disk.

As can be seen in FIG. 3, the trailing magnetic shield can wrap around the sides of the write pole to perform a side shielding function. The shield 232 is separated from the sides of the write pole 220 by non-magnetic side gap layers 306, 308 as well as being separated from the trailing edge 304 of the write pole 220 by the non-magnetic trailing gap layer 234 already discussed.

Figure 4:
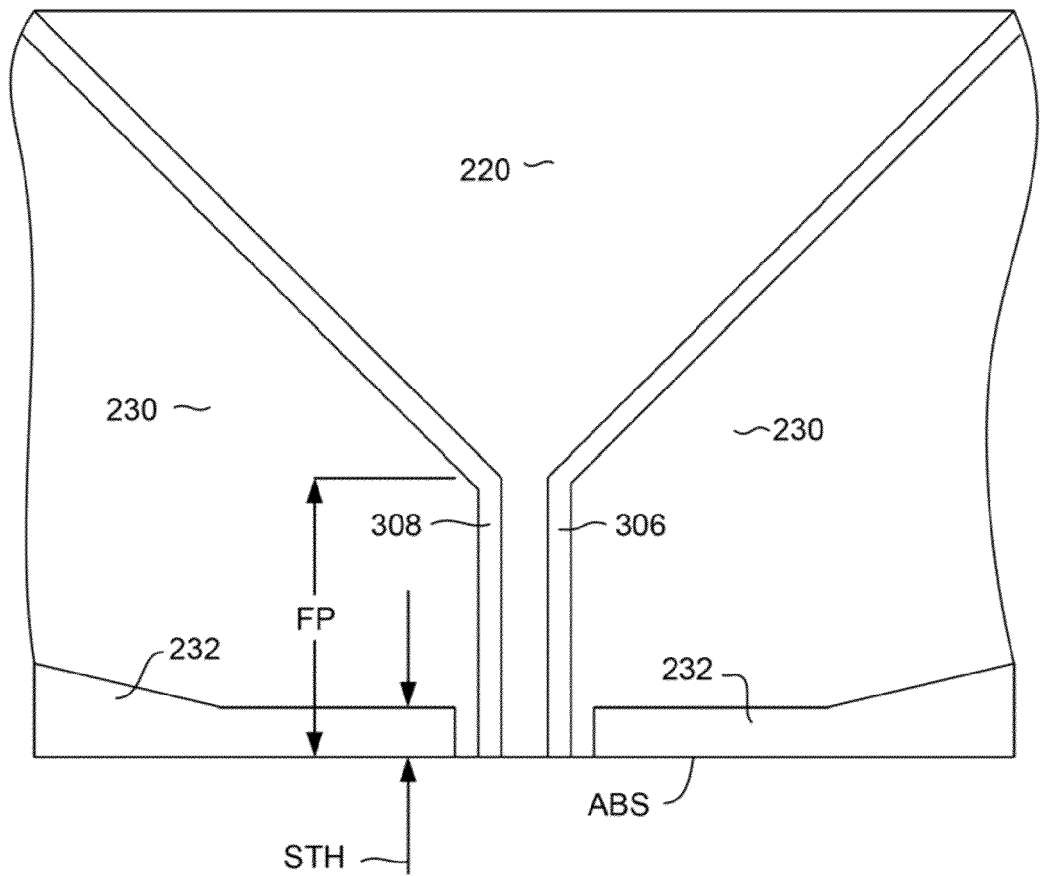
FIG. 4 is a top down, cross sectional view of a write pole and side shield of the magnetic head of FIGS. 2 and 3 as seen from line 4-4 of FIG. 3.

FIG. 4 shows a cross sectional top down view as seen from line 4-4 of FIG. 3. FIG. 4 shows the side portions of the shield 232 extending away from the write pole and being separated from the sides of the write pole by the non-magnetic gap layers 306, 308. Also, as can be seen in FIG. 4, the write pole 220 has a constant cross section throat portion located toward the ABS, but has then flares outward in a back portion that is removed slightly from the ABS. The point at which the write pole 220 transitions from the constant cross section portion to the flared portion is the flare point of the write pole. The distance between the flare point and the air bearing surface (ABS) defines the flare point distance FP. Also as can be seen, the shield 232 has a thickness measured from the ABS to its back edge that defines the shield throat height STH.

As mentioned above, the magnetic core width (MCW) is a critical parameter for the performance of the magnetic recording system. Because this is the actual dimension of a magnetic bit recorded by the magnetic write head on a magnetic media and because MCW is affected by many parameters of the write head, the actual MCW can only be physically verified after the head and slider have been assembled onto a suspension assembly and dynamically tested. Any heads not having a MCW that is within tolerance must be scrapped. As one can imagine, this can be very expensive, especially since the heads must already be assembled into a suspension before such testing can even be performed. The various structures and dimensions of the write head have been described great detail above because these structure and dimensions work together to affect the MCW of the finished head.

The present invention provides a mechanism for greatly reducing waste from heads not meeting the MCW design parameters by providing an improved mechanism for predicting the MCW and for understanding the interactions of various parameters and how they work together to affect magnetic core width MCW of a magnetic head. In addition the present invention allows the manufacturing parameters to be modified to optimize the MCW.

Increased demands for higher storage capacity solutions have driven the Hard Disk Drive (HDD) technological boundaries. Because the Perpendicular Magnetic Recording (PMR) head shows promising increase in Areal Density away from the limit of Longitudinal Magnetic Recording, HDD companies have switched to 100% PMR drives. PMR heads requires tight physical specifications in the fabrication of its writer element in order control the magnetic flux footprint of the writer on the disk. This magnetic footprint is also called the MCW (Magnetic Core Width), as described above with reference to FIG. 5. MCW variations in PMR heads results in significant yield loss in DETs (Dynamic Electrical Tests). In addition to that, continuous tweaking of wafer and slider fabrication processes to improve yield contributes to changes in MCW performance during DET. A new method that will learn and predict the MCW model accurately is thus necessary to successfully control MCW variation. An Artificial Neural Network multilayer Perceptron architecture has been developed and used to derive the MCW model from Wafer & Slider process parameters. The Artificial Neural Network model can be compared with a conventional Multiple Linear Regression (MLR) method and has shown that ANN gives better accuracy in predicting the final MCW than MLR by 30%.

The features of Artificial Neural Networks for nonlinearity, auto-fitting transfer function, adaptivity and fault tolerance gave it an advantage in providing better MCW prediction modeling than the MLR method. The inventors have found that MCW (Magnetic Core Width) is affected by identified factors in wafer and in the slider fabrication process. A MCW model was drafted to be able to fairly predict the final MCW in DET using Multiple Linear Regression (MLR) technique. In addition to low model predictability for MLR, wafer & slider fabrication have many variations within process and across time and the variations even interact with each other. These additional variation factors have been shown to contribute to unpredictable MCW model performance and inaccuracies during actual production run of the initial MCW, MLR model. Because of the highly complex nature of wafer and slider fabrication production, there is a need to use unconventional algorithm that will learn and predict MCW from Wafer and Slider parameters with more accuracy than conventional statistical methods such as those using Multiple Linear Regression.

Figure 6:
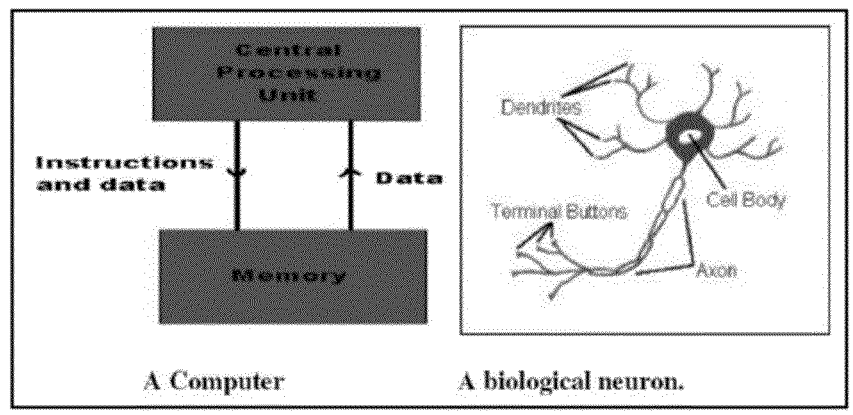
FIG. 6 is a schematic representation of a biological neuron and a computer simulated neuron.

Current MCW modeling needs to be improved for better MCW prediction using wafer and slider process data. The present invention provides improved MCW prediction by using artificial neural networks to analyze head and manufacturing parameters in order to predict MCW. Artificial neural networks (ANN) today stand at the epitome of research in artificial intelligence. Neural networks are based on the human way of learning from experience. Hence, they improve themselves with experience just as the neurons in a brain do. A real, biological neuron (nerve-cell) that is found in the brain is a superior logical network of a compact size and complicated networking-topology. FIG. 6 shows a simple illustration of such a neural network in both a biological neuron and schematically in a computer system. The brain is a highly complex, non-linear, parallel computer, which has the ability to organize its structural constituents called neurons, so as to perform certain computations. As such, the biological neurons remain superior to computers in the following ways:

1. They have intuitive intelligence.
2. They can tolerate differential (fuzzy) inputs and outputs instead of strictly binary ones.
3. They possess the capability of pattern-recognition which traditional computers lack.
4. They can intelligently process available data and learn from previous experiences.

In other words, any natural nervous system is highly plastic. It is this nervous plasticity that helps it to organize itself according to the surrounding environment. The brain for example can detect a familiar face in an unfamiliar environment in few milliseconds, whereas even a very fast computer would require hours to accomplish the same task. In more specific language, a brain or biological nervous system performs perceptual recognition, which even extremely complex computer networks do not perform well.

Of the aforesaid qualities of the nervous system, perceptual learning is the most prominent one. Artificial neural networks (ANNs) began as a means of testing natural neural networks on an experimental level. The development of ANNs began as a tool for examining natural neural networks. It was then soon realized that the networks could actually be used as alternatives to the classical computational methods.

Infrastructure of an Artificial Neuron:

When speaking of artificial neural networks, we need to design an artificial neuron first. McCulloch and Pitts proposed the first fundamental modeling of neural networks in 1943 in terms of a computational model of "nervous activity". The McCulloch-Pitts neuron is a binary device with a fixed "threshold logic". This model led to the works of John von Neumann, Marvin Minsky, Frank Rosenblatt and others.

Figure 7:
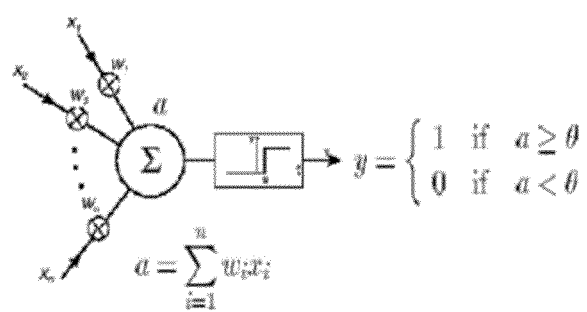
FIG. 7 is a schematic illustration of a Threshold Logic Unit of a Neural Network.

FIG. 7 represents a Threshold Logic Circuit (TLC) of a neural network. To replicate the effect of Post-Synaptic Potential in real neurons, the input signal is multiplied by a certain weight. Finally all signals are summed up into a unit activation, 'a'. This activation can be fed to a step generator. The output is "1" if 'a' exceeds the threshold value $\theta$ and "0" otherwise.

In the Threshold Logic Unit 'TLU' technique, a binary step-function-generator is used. If a non-binary output is required, a Sigmoid function-generator can be instead used, giving the output. The Threshold Logic Unit depends on the threshold value of the system, and the weight applied to each input. The TLU forms the basis of the Perceptron. A perceptron is a step ahead of the Threshold Logical Unit. A Neural Network is an interconnected assembly of simple processing elements, units or nodes, whose functionality is loosely based on the animal neuron. The processing ability of the network is stored in the inter-nit connection strengths, or weights, obtained by a process of adaptation to, or learning from, a set of training patterns. After the development of the Threshold Logic Unit, research focused on the development of creating a closer resemblance to a biological neuron. The resulting entity came to be called a 'perceptron'. The name itself conveys information about its nature. It is a network that learns through the 'perception' of its surroundings. It receives experience dynamically and can perceive it in real time. By doing this it gets better in its working and more intelligent in operation.

A 'Perceptron' is thus broadly defined as a logical interlinkage of processing elements (nodes), which impart on the resulting network, the ability to 'perceive' changes and conditions in its surroundings and to maneuver (direct) its behavior accordingly. The perceptron can be trained by adjusting the weights of the inputs with supervised learning.

Figure 8:
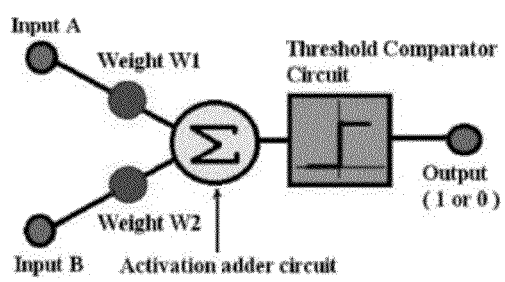
FIG. 8 is a schematic illustration of a Single Layer Perceptron.
Figure 9:
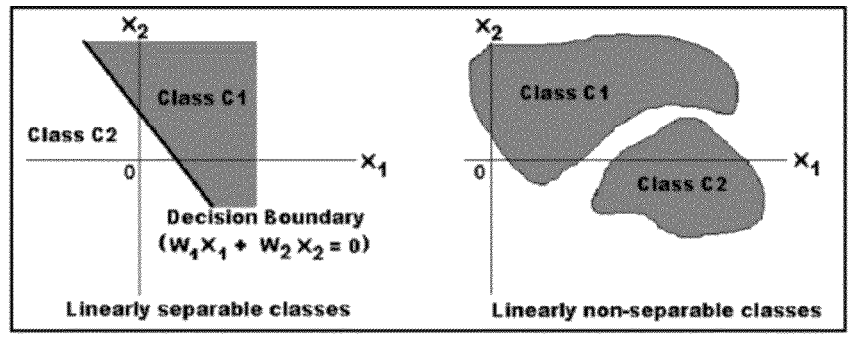
FIG. 9 is a graphical representation illustrating linearly separable and non-separable sets of data.

Single Layer Perceptrons (SLP):

A Single Layer Perceptron (SLP) has been discussed above. A SLP is only a simplistic realization of neural behavior. FIG. 8 shows an illustration of a Single Layer Perceptron model. The Single Layer Perceptron was invented by McCulloch and Pitts and was researched upon by Rosenblatt. It was supposed to be an explanation of human learning as understood by McCulloch in 20 years of his research. The process of learning in a Single Layer Perceptron is modeled by the Perceptron Convergence Theorem, which may be stated as: "A perceptron finds a linear discriminant function in finite iterations if the training set is linearly separable" The above theorem states that a Perceptron always finds a solution in finitely many steps, under certain limiting conditions, which require linear pattern types. FIG. 9 shows an illustration of what is meant by the term "linearly separable. In the case of an above shown SLP, points are added to class $C_1$ if the output is 1 and to class $C_2$ otherwise. This creates a decision boundary that separates classes $C_1$ and $C_2$ from each other. Since a single line can separate the two classes (sets), they are said to be linearly separable. It can be mathematically shown that the equation of this line is given by $W_1X_1+W_2X_2=0$. In the adjoining figure, a single straight line can never separate the two classes. Hence they are linearly non-separable. To reiterate then, the Perceptron Convergence Algorithm can be applied only to linearly separable patterns. Applications of Single Layer Perceptron: SLPs do not find too many applications in the practical field, where Multi Layer Perceptrons are used. However, they form the experimental units in neural network technology. Some representative applications of SLPs are:

1. They form an experimental tool-kit for study of natural neurons and development of artificial neurons.
2. They form the basis of Multi Layer Perceptrons.
3. They are used in adaptive filtering, which is of a primary concern in signal processing.

Figure 10:
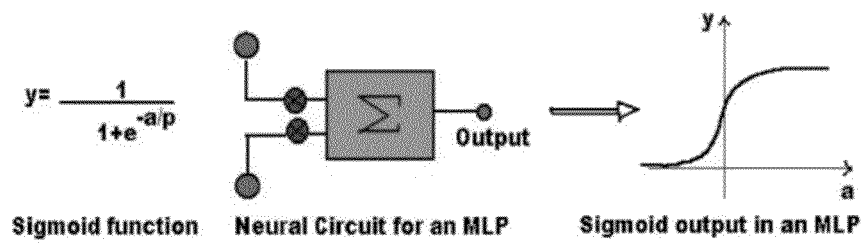
FIG. 10 is a schematic illustration of a Sigmoid function.
Figure 11:
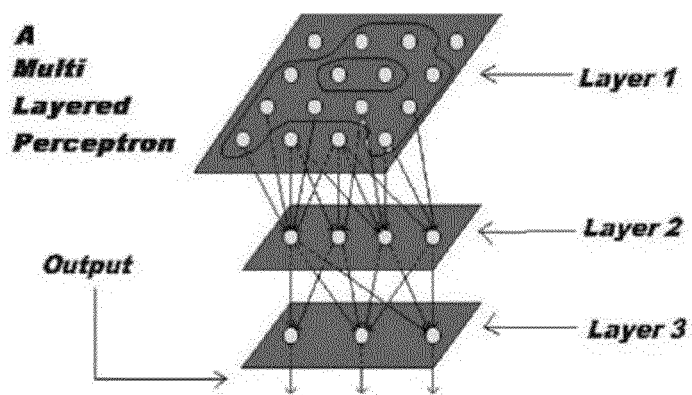
FIG. 11 is a schematic illustration of a Multi-Layer Perceptron.

Multi Layer Perceptrons:

Multi-Layer Perceptrons are those that accept inputs at various layers or levels. These Perceptrons are capable of forming complex neural networks that have profound practical importance. An MLP provides greater applicability than the SLP due to these following characteristics:

1. The activation adder circuit uses a non-linear function that is (generally) the Sigmoid function, which is illustrated in FIG. 10.
2. There are one or many hidden layers that lie between the input and the output layers, as illustrated in FIG. 11. These help in progressive learning of complex tasks.
3. There is high connectivity determined by synaptic connections and corresponding weights.

Applications of Multi Layer Perceptrons

MLPs are exactly the Artificial Neural Networks that are application-specific. Following is an outline of MLP applications:

1. They form the constituent units of advanced neural systems.
2. They highly resemble natural neurons in the way they learn from experience.
3. They are used in the implementation of Logic Gates.

4. They provide a robust control system for operation of devices in non-stationary or unknown environments.

5. We have seen that a Sigmoid function is used in MLPs instead of standard binary functions.

Figure 12:
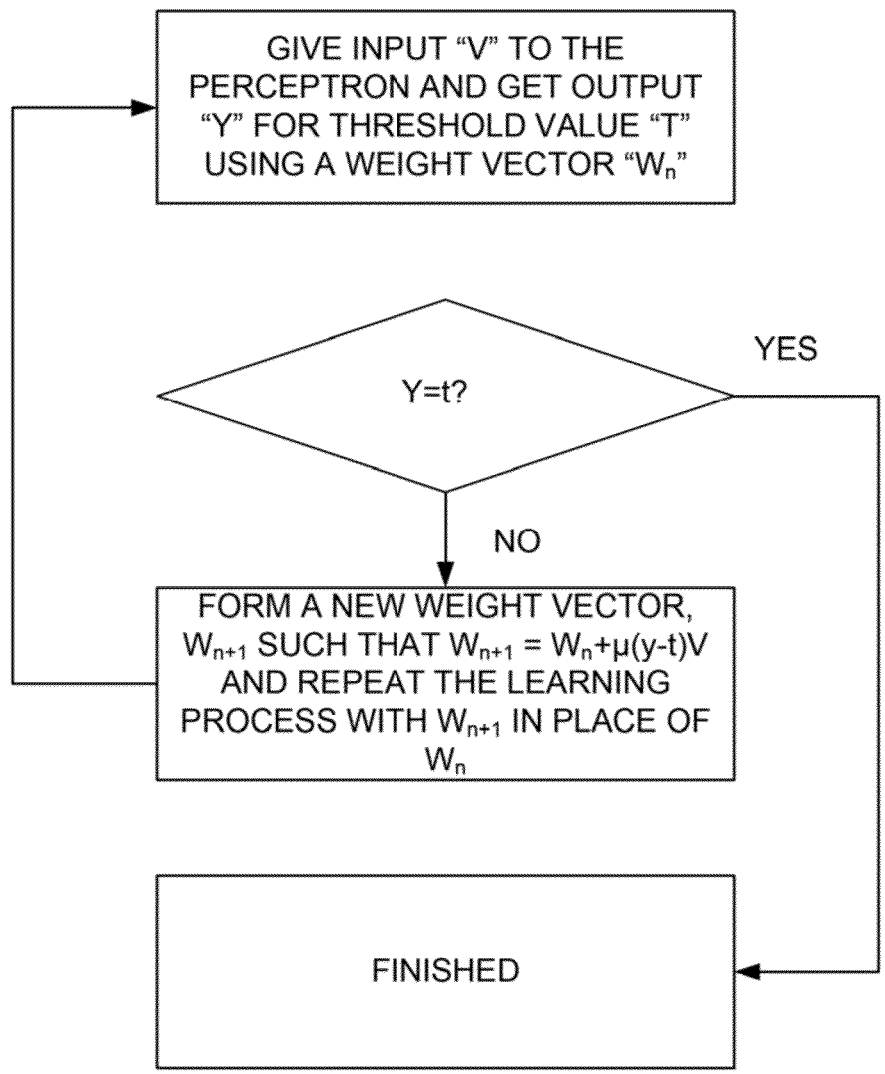
FIG. 12 is a flowchart illustrating a method for implementing an Artificial Neural Network to arrive at a solution to a problem.

Mechanism of Perceptron Learning:

Learning in a Perceptron is based on obtaining the desired output by way of adjusting the weights assigned to the inputs, this is called Backpropagation Learning. FIG. 12 shows a flowchart that schematically illustrates an algorithm for perception backpropagation learning.

Figure 13:
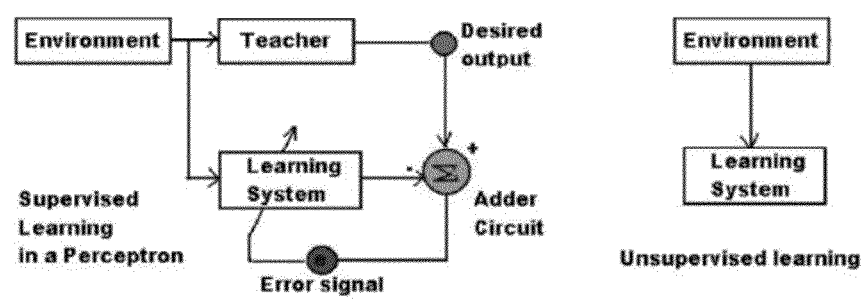
FIG. 13 is a schematic illustration of supervised and unsupervised learning.

The simplest way to classify learning can be as "supervised learning and unsupervised learning. A schematic illustration of supervised and unsupervised learning is shown in FIG. 13.

Unsupervised learning is simply, learning without a teacher. In such a process, the learning system learns from the data that it accepts from its surroundings. However, there is no teacher (guiding response) that will help the system to know what the desired output is. This process is indeed slow and non-reliable for complex problems. Supervised learning networks represent the main stream of the development in neural networks. In supervised learning, there is a teacher that conveys the desired output to the neuron. The neuron obtains an output using its present input-weights and compares it with the desired output. If both match, then a neural solution is found. Otherwise, the neuron adjusts the weights to its inputs and undergoes the same cycle again. These iterations continue till the desired and actual outputs are satisfactorily close to each other. Such a state is called the steady state of the neuron, and the neuron now gives the same desired output. When the above process is executed, the Perceptron finds an error given by: Error=e=desired output−obtained output. This signal 'e' actuates the learning system to apply corrective adjustments to the synaptic weights of neurons. These adjustments are designed to make the output nearer to the desired output, in a stepwise manner. This objective is in turn achieved by minimizing a cost function given by: $E=(\frac{1}{2})*e2$. Here, E is the instantaneous value of Error Energy. The stepwise adjustment of synaptic weights is done till the value of E is minimum and the system reaches the steady state giving a constant output.

Figure 14:
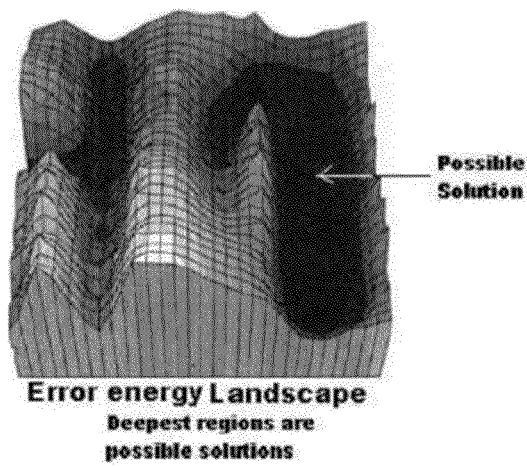
FIG. 14 is a three dimensional graph of Error Energy for various inputs.

FIG. 14 is a 3D plot of error energy for various inputs. For the part of figure that is in the deepest regions, the value of E is minimum and hence, the actual output is in good confirmation with the desired output. In other words, the neuron has found a solution by several iterations using its past experience. From the above explanation, it becomes clear that an artificial neuron replicates the natural process of learning in the sense that it makes use of past experience to make improvisation of its performance in the future. In a simple language, it tries to minimize the error between the desired output and the actual output by adjusting the importance that it assigns to each input. The main advantage of such learning is that it can be used in, any conditions, known or unknown, and does not require any special knowledge about the surrounding environment. This is important because neural machines do not have to be trained inherently; they get trained by themselves as if they are living beings that can understand how they should behave so as to best suit the situation they are in.

Applications of Neural Networks:

The nature of real world problems broadly falls into four types:

1. Classification: Process control, forecasting, signal processing, etc.

2. Pattern recognition: Image processing, Data fusion and Symbol recognition.

3. Optimization: Operation research problems.

4. Real numbers: Robotics, Data forecasting, Approximation theory, Financial mapping, Game theory, etc. Artificial Neural networks can be applied to all aforesaid cases. ANNs, due to their massive interconnections, Parallel architecture, Inherent non-linearity and Fault tolerance, can well suit these complex problems making them suitable for intelligent control. Learning pervades every level of futuristic intelligent machines. In the race for perfection, it has become imperative to make technical products as smart as the engineers who make them. Neural networks represent a multi-disciplinary subject with foundations in Cognitive Physics and Neurology. Their ability to learn with or without supervision has endowed them with powerful properties. Neural networks have a great deal to offer when the solution of a problem is made difficult due to lack of physical understanding of the problem, statistical variations in observable data and non-linearity in generation of outputs.

ANN Application to Manufacturing

Operational Decision Support using Artificial Neural Network:

A common situation in industrial operations is that the outcome of a manufacturing process is often influenced by many variables; however, only a subset (perhaps only one) of these variables is controllable. Engineers must determine the right setting for a process or course of action to take, given information about the current situation, in order to achieve desired outcomes or to produce a "good" product. Sometimes the decision can be made based on previous experience, but often trial and error is necessary when previously unseen combinations of values are encountered. Neural networks can be used to assist in the decision making process by being trained to learn the relationship between these variables and process outcomes. The data used for this training may be taken from previously collected process data, or collected through experimentation. The trained network may then be used to test certain settings to determine the output, or may be further analyzed to provide the optimal setting or best decision given the current situation (Kamruzzaman et al, 2006).

Coit, Jackson, and Smith (1998) demonstrated the use of neural networks in two industry examples; wave soldering and slip casting. In the wave soldering example, the problem was to develop a model to determine the best process settings (i.e., pre-heater temperature and belt speed) for the wave soldering machine in order to minimize the number of solder connection defects in the printed circuit boards (PCBs). Each PCB had several design characteristics, such as mass, size, and component density, and the firm produced many different models. As the thermal condition of the card when it enters the solder wave was considered the most important determinant of the soldering quality, this data was collected using special testing apparatus over a period of two months. Thermal condition of a card is described by the mean temperature, standard deviation, and temperature gradient at the wave.

Three feed-forward neural networks, each with one output node, were constructed to predict the thermal condition (mean temperature, standard deviation and gradient) based on the design parameters of the PCBs and the process settings. Each network consisted of 14 inputs: design inputs, such as length of the card, card mass, and thickness; and process settings, which included four pre-heater temperatures and the belt speed. Finally, another neural network was constructed to use the thermal predictions as input to predict the category of solder quality (i.e., excellent, good, or fair).

Coit, Jackson, and Smith (1998) also detail the use of neural networks in predicting quality in a slip-casting process. While slip casting allows for the production of complex shapes such as sinks or statues, it is difficult to produce products that are free from defects, given the number of variables that can affect the quality of the casting. In order to avoid fractures and/or deformities in a casting, the moisture gradient within the casting should be as uniform as possible. As well, another output measurement of the process is casting rate, which is the thickness of the cast achieved during the casting time; the higher the casting rate, the less time the cast must spend in the mold.

In this application, neural networks were used to predict the moisture gradient and casting rate given ambient conditions (relative humidity and temperature), the casting time and properties of the slip (such as moisture content, viscosity, and temperature). The manufacturer had substantial production data with these parameters, and additional experiments were conducted to measure the effects of extreme values of the ambient temperature, humidity, and sulfate content in the slip. In all, ten slip variables, the two ambient or state variables, and the casting time were used as input to two feedforward neural networks with either moisture gradient or casting rate as the single output. Lam, Petri, and Smith (2000) discuss the process improvement module and the fuzzy-logic expert system which used these neural networks to recommend the best set of controllable variables and casting times. This system has been implemented at a major U.S. plant.

Another example is that of Philipoom, Wiegmann, and Rees (1997) in the assignment of due dates to jobs arriving at a shop, where there is work in process, and the processing times at each stage of production are random variables. The goal is to assign a due date (date for completion as quoted to the customer) to an arriving job that will minimize the expected penalty cost due to early or late completion. Here, the authors assumed that the cost for late completion was different than for early completion. Three different shop configurations were simulated, and then 23 job specific and shop-specific characteristics were measured each time a job entered the simulated shop. The departure time of each job was also measured. A neural network was then trained using the 23 characteristics as input and the departure times as outputs. Mathematical programming and OLS regression techniques were also used to predict the completion time of each incoming job. Each model was presented with new data, and then the difference between the predicted completion date (assigned due date) and the simulated completion date were used to calculate the penalty cost incurred for each job. Overall, the neural network performed as well or better than the other techniques tested for these examples. Schlang et al. (1997) reported on the use of neural networks in the steel industry. One application was in a wide-strip hot-rolling process, where steel sheets underwent pre-rolling in a roughing mill prior to being brought to a final thickness by a finishing mill. The width of the sheets could only be controlled at the roughing stage, although material characteristics and the state of the finishing mill were also known to be factors in the final width of the sheets after the finishing stage. Due to the variability in processing, a safety margin of several millimeters was used to ensure the sheet was not too narrow after finishing. Any excess width after the finishing stage was trimmed off and recycled. A neural network was built and trained to predict the width of a sheet of steel after the finishing stage, given such information as the material composition, material temperature, and finishing mill parameters, and also the initial settings at the pre-rolling stage. Because the network could more accurately predict the final width of the sheet, the safety margin could be reduced, therefore reducing the amount of recycling. Kilmer, Smith, and Shuman (1999) developed parallel neural networks as meta-models for discrete event simulations. They modeled an (s,S) inventory system and determined the expected system cost and variance, given selected values of setup cost, stock out cost, and values of s and S. Two neural networks were then trained; one with the expected system cost as the output and the other with the variance of the average cost from multiple replications of the simulation at each point. These estimates were then used as confidence intervals for the expected total cost, and shown to closely replicate results from the simulation model itself when tested on data points not originally in the training set. Sabuncuoglu and Touhami (2002) estimate manufacturing system performance using neural networks. They experimented with both simple and complex systems, and with using deterministic and stochastic processing times and inter-arrival times. In these experiments, a due date for an arriving job is determined based on the total work content of the job multiplied by a tightness factor. The simulation models were run with varying inter-arrival times, tightness factors, and queue waiting discipline (shortest processing time, earliest due date, or modified operation due date). The mean machine utilization, mean job tardiness and mean job flow time for each job were recorded. A feed-forward neural network was then trained (using backpropagation with momentum) for each experiment with the inter-arrival time, tightness factor and queue-waiting disciplines as inputs, and one of the performance measurements as the output. Huang, et al. (1999) examined the use of neural networks to predict the WIP levels and throughput for operation stages of a wafer-fabrication process. The goal was to develop a network which could predict the WIP level and throughput of an operation stage in the next time period, given information on the current situation, so that managers could proactively implement corrective actions. They determined through testing that using the current WIP levels and throughput at an operation stage, as well as the same levels from the two upstream operation stages, as inputs to a feed-forward neural network trained with back-propagation provided the best prediction results. They recommended a two-stage procedure for the implementation of the network. The predicted WIP levels and throughput from the network were compared to the standard performance measures and represented as "high", "normal" or "low". Predictions other than "normal" indicated that managers needed to implement corrective actions. The ability of feed-forward neural networks to approximate the functional relationship between input and output variables, even with incomplete data, is very useful in this application. One perhaps obvious caution is that a trained network is only valid for the process data on which it was trained. The examples presented earlier are static, in that it is assumed that the system itself does not change. If the process is changed, the network should be retrained. Since processes may change over time, periodic testing and or retraining should also be implemented.

Artificial Neural Network as Simulation Meta-Models:

In the design of manufacturing operations, there are usually several performance measurements of interest, such as throughput, average work-in-process inventory (WIP), or machine utilization. These measures are interrelated and sometimes conflicting. There may also be several design variables, such as number of kanbans or buffer sizes at each station, which will influence these measurements. Because of the complexity of these systems, simulation models are used to estimate system performance given a set of design values. Depending on the number of input variables, and the number of values that those variables could take on, the number of variable combinations can be so large that simulating all of them is not practical or even possible. Therefore, further work is necessary to ascertain the set of design parameters that will lead to the desired or optimal system performance.

Simulation optimization techniques (Andradottir, 1998; Fu, 2002; Tekin & Abuncuoglu, 2004) have been employed in the search for the best set of design parameters. However, a preferable approach is to develop a simulation meta-model. Meta-models are constructed to approximate the functional relationship between the inputs and outputs of the simulation model. The particular approach is to use feed-forward neural networks as simulation meta-models. Barton (1998) gives a broader overview of simulation meta-models, including response surface modeling.

The main idea is that networks are trained on a subset of possible design parameter combinations using the resulting performance measurements obtained from the simulation model. The starting point is a simulation of a manufacturing system operating under a certain set of design parameters. Then, a neural network can be trained to estimate the performance measurements (outputs). Once trained, the networks may then be used to perform scenario analysis rather than using the original simulation model. The network model may also be used to determine an optimal set of input parameters, based on minimizing (or maximizing) a single output or a cost function of multiple outputs. Further simulations may be carried out near the "optimal solution" to validate the result. The network meta-model may also be used to identify input regions of interest, where the outputs satisfy a set of constraints, and more in-depth analysis of these regions should be carried out. Hurrion (1997) developed a method for finding the optimal number of kanbans in a manufacturing system using a neural network as an alternative to simulation-optimization techniques. The example system used in this case consisted of two manufacturing cells that produced three intermediate parts and four finished products. Demand for each product arrived according to a Poisson process, and processing times at both cells varied by component. The system was to be controlled using kanbans, and therefore the problem was to determine the number of kanbans to be assigned to the seven stock points. The system was to be evaluated using a composite cost function, which was a function of the average WIP and the product-delay time (defined as the amount of time between the receipt of an order and the completion of the product). A Visual Interactive Simulation (VIS) model of a manufacturing system was built and run under different configurations, and a feed-forward neural network was trained using backpropagation. Inputs to the network consisted of 7 nodes (one for each kanban), and 10 output nodes consisting of an upper and lower confidence interval for the five response variables. These were the product-delay times for the four products and the average WIP. The network was then used to evaluate all possible combinations of kanban allocations and determine the combination that minimized the cost function. The solution given by the network demonstrated that the cost function was fairly flat in the region of this solution. This solution and all other feasible adjacent solutions were further evaluated using the original simulation model, and a statistical test was conducted to determine the best solution amongst this set. This technique was repeated for two further iterations until the final optimal solution was determined. The author acknowledged that a Response Surface Methodology (RSM) could have been used, but would only have been valid for the cost function used. In this approach, if a different cost function were to be evaluated, the neural network developed by this technique could be used, as only the last procedure need be repeated.

Artificial Neural Network for Operational System Control:

Control problems are distinguished from decision support in that the consequences of a control decision are both an immediate cost or benefit and the fact that the system is now in a new state from which another control decision needs to be taken. The view of manufacturing systems as a manufacturing-control problem has been current for some time now (Gershwin, Hildebrant, Suri, & Mitter, 1986). Typically, these control systems are challenging to optimize. Although the focus of this chapter is on feed-forward networks used as approximators, it is worth noting that recurrent neural networks have been developed (Rovithakis, Gaganis, Perrakis, & Christodoulou, 1999) to provide controllers for quite complex manufacturing systems. The aim of the controller is to maintain the system at prescribed buffer levels (WIP levels) in a stable manner. In Rovithakis, Perrakis, and Christodoulou (2001), an application of this neural network control is reported to perform well on a real manufacturing system aimed at controlling WIP levels for 18 product types in a job-shop environment.

Multiple Linear Regression & $R_2$:

Multiple linear regression (MLR) is a means to express the idea that a response variable, y, varies with a set of independent variables, x1, x2, ..., xm. The variability that y exhibits has two components: a systematic part and a random part. The systematic variation of y is modeled as a function of the x variables. This model relating y to x1, x2, ..., xm is called the regression equation. The random part takes into account the fact that the model does not exactly describe the behavior of the response. Multiple linear regression fits a response variable y to a function of regressor variables and parameters. The general linear regression model has the form $$\mu_y = \beta_0 + \beta_1 x_1 + \beta_2 x_2 + \ldots + \beta_p x_p$$

This expression is the population regression equation. We can think of subpopulations of responses, each corresponding to a particular set of values for all of the explanatory variables $x_1, x_2, \ldots, x_p$. In each subpopulation, y varies normally with a mean given by the population regression equation. The regression model assumes that the standard deviation of the responses is the same in all subpopulations. We do not observe the mean response, because the observed values of y vary about their subpopulation means.

We combine the population regression equation and assumptions about variation to construct the multiple linear regression model. The statistical model for linear regression consists of the population regression line and a description of the variation of y-values about the line. The following equation expresses the idea:

$$DATA = FIT + RESIDUAL$$

The subpopulation means describe the FIT part of our statistical model. The RESIDUAL part represents the variation of observations about the means. To perform multiple linear regression, we need to know that the deviations of individual y-values about their subpopulation means are normally distributed with mean 0 and an unknown standard deviation that does not depend on the values of the x variables. The assumption that the subpopulation means are related to the regression coefficients by the population regression equation implies that we can estimate all subpopulation means from estimates of the factors. To the extent that this equation is accurate, we have a useful tool for describing how the mean of y varies with the x's. For simple linear regression the principle of least squares is used to obtain estimators of the intercept and slope of the regression line. For multiple regression the principle is the same but more complicated. Let ($b_0$, $b_1$ $b_2$, ..., $b_p$) denote the estimators of the parameters $\beta_0$, $\beta_1$, $\beta_2, \ldots, \beta_p$ for the ith observation the predicted response is $\hat{y}i$, the value of y we obtain, by substituting the x-values for this observation in the equation $$\hat{y} = b_0 + b_1 x_1 + b_2 x_2 + \ldots + b_p x_p.$$

The ith residual, the difference between the observed and predicted response, is therefore residual$_i$=observed response−predicted response or yi−$\hat{y}$i.

The method of least squares chooses the values of the b's that make the sum of the squares of the residuals as small as possible. We can obtain confidence intervals and perform significance tests for each of the regression coefficients $\beta j$.

To test the hypothesis $H_0$: $\beta_j=0$, compute the t static, $t=b_j(SE_{bj})$. In terms of a random variable T having the t(n−p−1) distribution, the P-value for a test of $H_0$ against:

$H_a$: $\beta_j > 0$ is $P(T \geq t)$ $H_a$: $\beta_j < 0$ is $P(T \leq t)$ $H_a$: $\beta_j \neq 0$ is $P(T \geq |t|)$.

Because regression is often used for prediction, we may wish to construct confidence intervals for a mean response and prediction intervals for a future observation from multiple regression models. The basic ideas are the same as in the simple linear regression case. In most software systems, the same commands that give confidence and prediction intervals for simple linear regression work for multiple regression. The only difference is that we specify a list of explanatory variables rather than a single variable. The usual computer output for regression includes additional calculations called analysis of variance. Analysis of variance, often abbreviated ANOVA, is essential for multiple regression and for comparing several means. Analysis of variance summarizes information about the sources of variation in the data. It is based on the DATA=FIT+RESIDUAL framework.

Squared Multiple Correlation $R^2$:

For simple linear regression the square of the sample correlation could be written as the ratio of SSM to SST and could be interpreted as the proportion of variation in y explained by x. A similar statistic is routinely calculated for multiple regression.

The statistic $$R^2 = \frac{SSM}{SST} = \frac{\sum (\hat{y}_i - \bar{y})^2}{\sum (y_i - \bar{y})^2}$$

is the proportion of the variation of the response variable y that is explained by the explanatory variables x1, x2, . . . , xp in a multiple linear regression. Often, $R_2$ is multiplied by 100 and expressed as a percent. The square root of $R_2$, called the multiple correlation coefficient, is the correlation between the observations yi and the predicted values $\hat{y}$i. Although Multiple Regression can be used to derive a model of a system or process, it still lacks the robustness that Artificial Neural Networks delivers in approximating any kind of function within a desirable range, without the necessity to impose any kind of hypothesis a priori on the characteristics of the correlation function (Kamruzzaman, Begg, Sarker, 2006).

Figure 15:
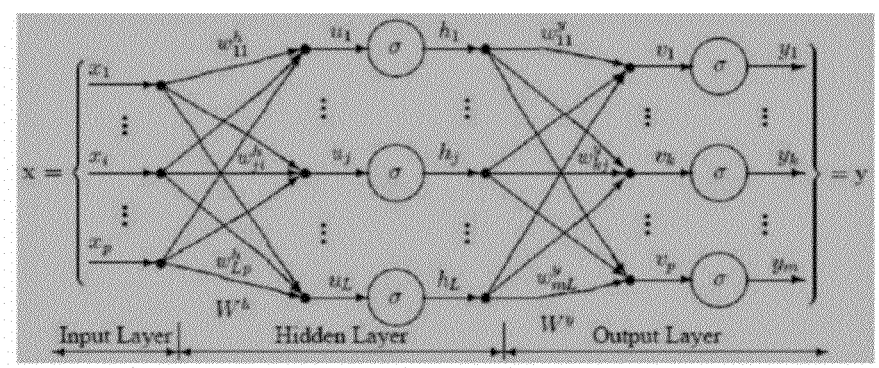
FIG. 15 is a schematic illustration of a Multi-Layer Perceptron Artificial Neural Network.

Artificial Neural Network—Multilayer Perceptron:

Multilayer Perceptron Neural Network is a feed-forward neural network mechanism. In feed-forward neural network the neurons of the first layer drive their output to the neurons of the second layer, in a unidirectional manner, means the neurons are not received from the reverse direction. Incorporating three layers, input, output and intermediate, the Multilayer Perceptron designates distinct roles for each. The input layer maintains equal number of neurons corresponding to that of the variables in the problem. The output layer comprises a number of neurons equal to the preferred number of quantities, computed from the input and makes accessible the Perceptron responses. The intermediate or hidden layer takes care of approximating non-linear problems. Processing linear problems necessitates the presence of only the input and output layer of the MLP. Data having discontinuities like saw tooth wave pattern necessitate the presence of two hidden layers for prototyping. The risk of congregating to local minima is greater while using two hidden layers and it seldom refines the model. Hypothetical rationale behind implementing more than two hidden layers is also void (Sherrod, 2008). Separate weights are applied to the sums forwarded to each layer while the output from the first hidden layer is fed to the input of the next hidden layer, in scenarios where more than one hidden layers is deployed. A general structure of a MLP comprising three layers is shown in FIG. 15.

The only task of the neurons in the input layer is to distribute the input signal $x_i$ to neurons in the hidden layer. Each neuron j in the hidden layer sums up its input signals $x_i$ after weighting them with the strengths of the respective connections $w_{ji}$ from the input layer and computes its output $y_j$ as a function f of the sum, given by:

$$y_j = f(\Sigma W_{ji} X_i)$$

where, "f" can be a simple threshold function such as a sigmoid, or a hyperbolic tangent function. The output of neurons in the output layer is computed in the same manner. Following this calculation, a learning algorithm is used to adjust the strengths of the connections in order to allow a network to achieve a desired overall behavior.

Figure 16:
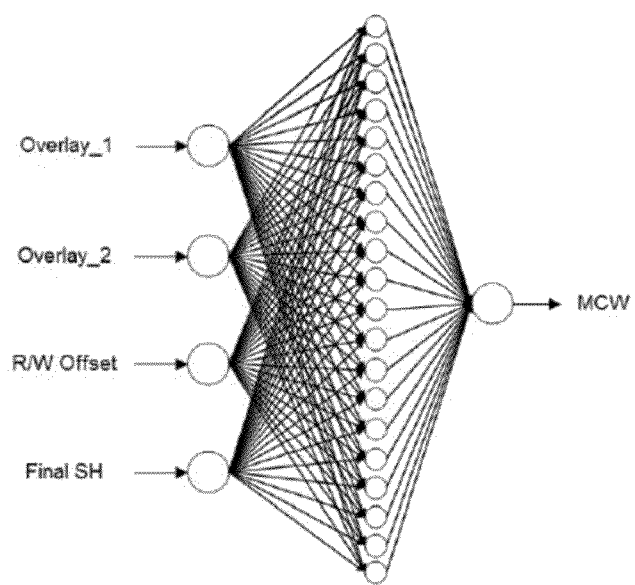
FIG. 16 is a schematic illustration of an Artificial Neural Network Multi-Layer Perceptron three layer model for magnetic core width modeling.

Backpropagation network learning is one of the most widely used supervised neural network learning methods as it is simple and effective. The architecture of the Artificial Neural Network Multilayer Perceptron using backpropagation learning has been discussed in section above. For this study the input layer consists of four input variables (Overlay_1, Overlay_2, R/W Offset & Final SH) to the network. The output layer has one which is the MCW predicted. In the ANN simulation, the simplest and best results was obtained by using one hidden layer consisting of six to twenty neurons optimized for each wafer, see FIG. 16.

The following equations are used in a Multilayer Perceptron with Backpropagation Learning Algorithm (Dadios, 1996):

O=desired output pattern
x=output of input layer
γ=momentum parameter
λ=learning rate parameter for the hidden layer
μ=learning rate parameter for the output layer
$y_j = f((\Sigma x_i W_1[i][j]) + Y_j)$=output of jth hidden layer
$z_j = f((\Sigma y_i W_2[i][j]) + \tau_j)$=output of jth output layer
$O_i - z_i$=ith component of vector output difference
$e_i = z_i(1-z_i)(O_i - z_i)$=ith component of output error at the output layer
$t_i = y_i(1-y_i)(\Sigma j W_2[i][j] e_j)$=ith component of output error at the hidden layer
$\Delta W_2[i][j] = \mu y_i e_i + \gamma \Delta W_2[i][j](t-1)$=adjustment for weight between ith elements in hidden layer and jth output elements
$\Delta W_1[i][j] = \lambda x_i t_i + \gamma \Delta W_1[i][j](t-1)$=adjustment for weight between ith input elements and jth elements in hidden layer
$\Delta \tau_j = \mu e_i$=adjustment to the threshold value or bias for the jth output elements $\Delta Y_j = \lambda e_j$ = adjustment to the threshold value or bias for the jth hidden layer elements $f(x) = 1/(1+e_{-x})$ = threshold function The Multilayer Perceptron program (DTREG) needs the following information from the user:

(a) Number of network layers—a neural network model with 3 total layers has one input layer, one hidden layer and one output layer. With 4 layers, the network has one input layer, two hidden layers and one output layer.

(b) Number of neurons—this is the number of neurons in the hidden layer(s). The program allows the specification of a fixed number of neurons, or it can search for the optimal number of neurons.

(c) Overfitting detection & prevention option—Overfitting occurs when the parameters of a model are tuned so tightly that the model fits the training data well but has poor accuracy on separate data not used for training. The program holds out a specified percentage of the training rows and uses them to check for over-fitting as model tuning is performed. The tuning process uses the training data to search for optimal parameter values. But as this process is running, the model is evaluated on the hold-out test rows, and the error from that test is compared with the error computed using previous parameter values. If the error on the test rows does not decrease after a specified number of iterations then the program stops the training and uses the parameters which produced the lowest error on the test data.

(d) Number of convergence tries—this sets how many sets of random starting values the program should use when trying to find the optimal set of network parameters.

(e) Convergence tolerance—the conjugate gradient algorithm will iterate until the specified convergence tolerance is reached or it is stopped for another reason such as reaching the maximum allowed number of iterations. The convergence tolerance value specifies the proportion of residual unexplained variance that is left. That is, the convergence tolerance value specifies the remaining $R_2$ variance. For example, if a tolerance factor of 0.001 is specified, then the algorithm iterates until residual, unexplained $R_2$ reaches 0.001 which means that the explained $R_2$ reaches 0.999 (99.9%).

(f) Maximum iterations—the maximum iterations to set the program to perform during the conjugate gradient optimization.

(g) Iterations without improvement—after each iteration, the program measures the residual error of the model using the weight values calculated by the iteration. If the error does not improve after this many consecutive iterations, DTREG assumes the weights have converged to the optimal values, and it stops the training process.

(h) Minimum improvement delta—this is the amount of improvement in the residual model error required for the program to count an iteration as having improved the model. If the error is improved by less than this amount (or not at all) then no improvement is counted.

(i) Min. gradient—if the largest weight gradient value is less than this parameter, the program assumes it has reached an optimal (flat) section of the error space and stops the learning process. A gradient value measures the change in the model error relative to a change in a weight value, so a small gradient indicates that little improvement can be made by changing the weight value.

(j) Max. minutes execution time—if this value is non-zero, the program will stop the learning process after the specified number of minutes of run time and use the resulting weights as the final ones for the model.

MCW Factors:

Basic Wafer factors directly affecting Magnetic Core Width (MCW) is Flare Point height (Writer Height) (FP, FIG. 4) and Wrap Around Shield (WAS) dimensions namely Throat Height (STH, FIG. 4) and Side Gap (SG FIG. 3). Flare Point height is defined by the Wafer Fabrication process Overlay 1, and for the Wrap around Shield dimensions the Wafer Fabrication process Overlay 2. "Overlay" refers to the processes used to form a structure, and includes forming a mask to define a structure as well as material deposition, ion milling, reactive ion etching or other processes used to form the structure defined by the mask "overlay".

Overlay 1 & Overlay 2 dimensions from Wafer data are interpolated to get profiles for all sliders since only a few Overlay data dimensions are measured within a wafer. The magnetic flux created by the Writer Coil is funneled through Writer Pole (FP Height). Excess flux is controlled by the WAS. It is critical to control the FP Height and WAS dimension to control MCW footprint (502, FIG. 5) created by the Writer. The selection of these drivers is based on the analysis of the production processes and on the identification of all the elements that play a role in such a process. It is clear that the processes that change or define the Writer physical dimension are relevant to the definition of the final Writer performance or MCW. On the other hand, other drivers are not so obvious and for this case only the most relevant factors are used in the model to compare between two modeling techniques. During the initial step in Slider Fabrication Lapping process, the Reader & Writer offset is corrected by lapping the slider with a given lapping angle per row. This adjustment will give the initial information for variability of the Writer Pole location within row.

A final Lapping step defines the Final Reader Stripe Height (Final SH). This process doesn't take into account the FP height, but knowing the writer variability from Reader/Writer Offset one can derive the final MCW from Final SH. Below equation shows the basic MCW factors:

MCW=Overlay 1 (Overlay 1 sensitivity)+Overlay 2 (Overlay 2 sensitivity)+Reader/Writer Offset (Reader/Writer Offset sensitivity)+Final SH (Final SH sensitivity).

Figure 17:
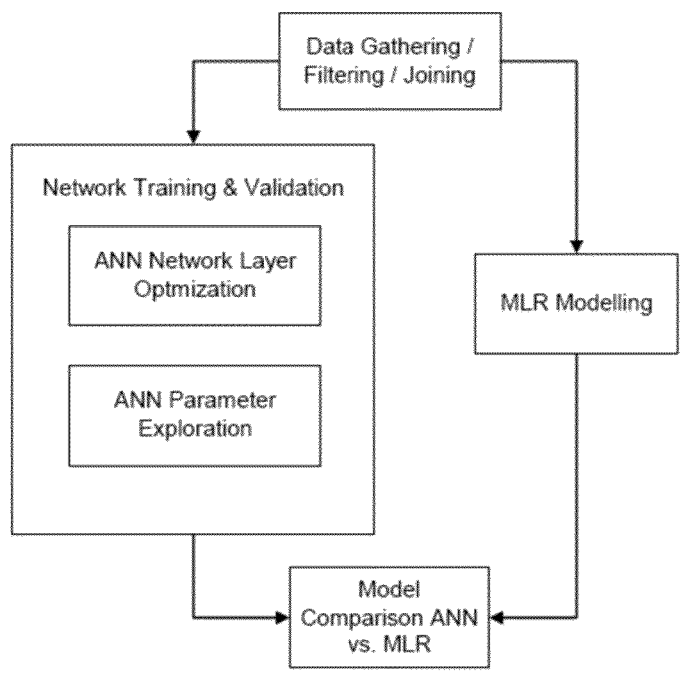
FIG. 17 is a flow chart illustrating a magnetic core width modeling methodology.

The methods used can be broken down into 4 main stages as (a) Data Gathering, (b) Network Training & Validation, (c) Modeling using MLR and (d) MLP & MLR Model Comparison. FIG. 17 shows these stages in the algorithm used for this study.

Data Gathering:

In the Data Gathering stage, production data was collected for 5 wafers. Each input variable was gathered separately for Wafer data: Overlay_1 & Overlay_2, Slider Fab Data: R/W Offset & Final SH and DET: MCW data.

Figure 18:
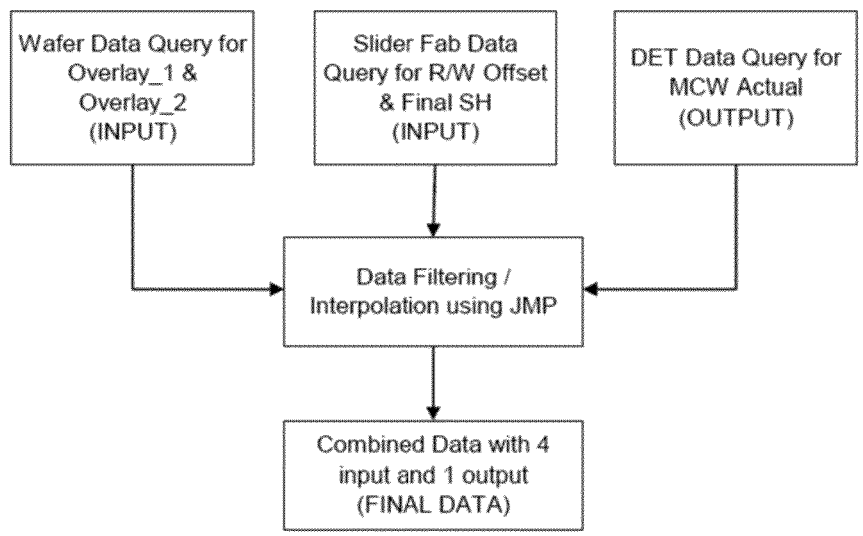
FIG. 18 is a flow chart illustrating a method of gathering data.
Figure 20:
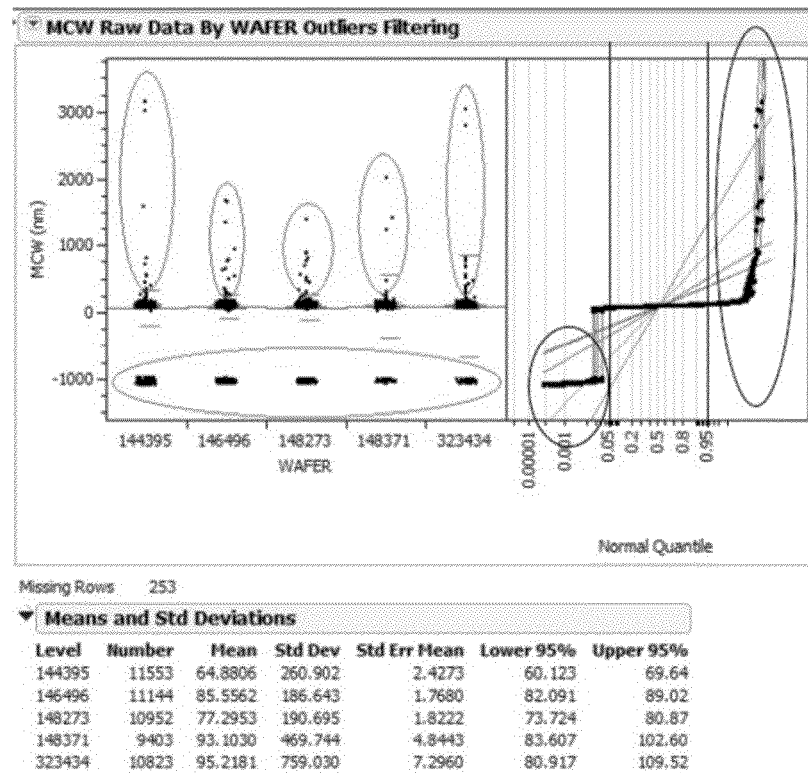
FIG. 20 is a graph illustrating raw data results for data used in calculating magnetic core width and showing outlier data for such data results.
Figure 21:
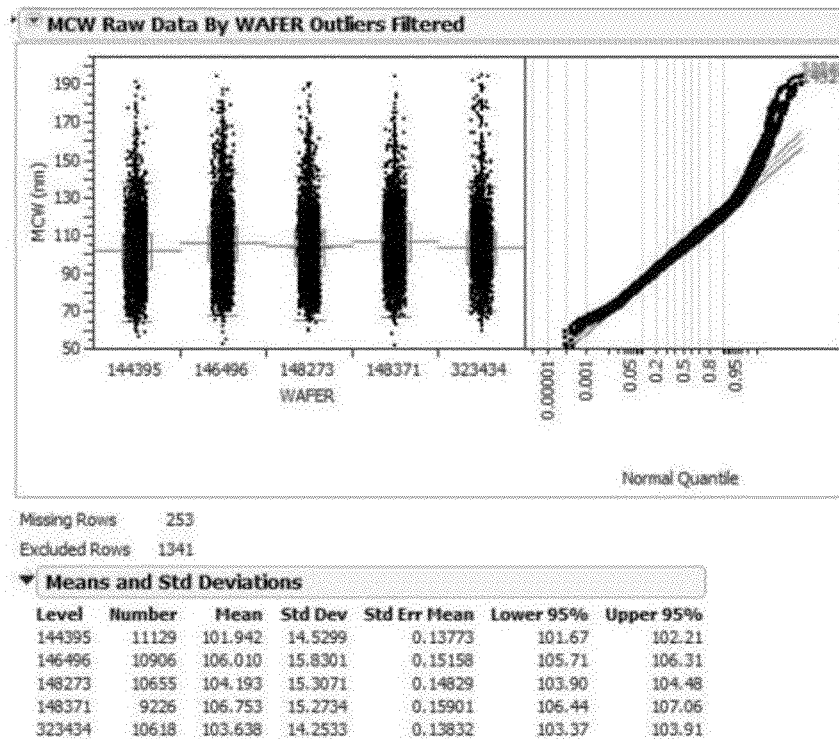
FIG. 21 is a graph illustrating raw data results for data used in calculating magnetic core width with outlier data filtered out.

Data collection also includes the identification of information sources and the corresponding business functions responsible for their maintenance and update. Once the data have been gathered, it is necessary to evaluate the consistency of the available data in terms of measurability, reliability, and completeness (i.e., real information content). In particular, with regard to the last point, data results could be unsuitable or insufficient, leading to recycles on the previous phases or they could be redundant, causing inefficiencies. Software can be used to trim bad data, interpolate Wafer Overlay_1 & Overlay_2 & combine the input parameters with MCW. FIG. 18 shows the data gathering flow, and the Table of FIG. 19 shows the input and output details for an example of a set of data. Wafer Data has few data points for Overlay_1 & Overlay_2. To increase data points interpolation of data points is done using spline fitting. Once the data has been interpolated we can now see the wafer variability as a whole for mask alignment. For R/W Offset, final SH & MCW data its availability within wafer is compared with wafer to wafer data. What is needed to be done is to filter outliers. The method used for filtering is to exclude data points that are 5% extremes of the normal quantile plot. FIG. 20 shows the actual MCW raw data and the circles indicate outliers outside 5% of the normal quantile plot that that need to be excluded. FIG. 21 shows the final magnetic core width after filtering out outliers from the raw data.

After data filtering has been done for R/W Offset, Final SH & MCW data. Data table can now be joined. Data from each individual table is joined by using individual sliders serial identification to ensure data is one to one. Software can be used to join 4 data tables, including Overlay_1 & Overlay_2. The table of FIG. 22 shows an excerpt of the final data with input and output data joined in one table.

Network Training & Validation:

Network training & validation is performed for each wafer. To derive the best MLP architecture, a two step simulation is done. The 1st step is to determine the best number of hidden layers and the number of neurons for that hidden layer. It involves three trials (Trial 1) using four layers with two hidden layers each having 20 neurons (Trial 2) using 3 layers with 1 hidden layer having 20 neurons and (Trial 3) using 3 layers with automatic hidden layer optimization technique, as shown by way of example in FIG. 23.

The 2nd step is to explore the network learning to the maximum convergence and iteration. It involves eight trials. Trial (A) will be the results of Step 1 best condition. Trial (B) reduces the convergence tolerance from 0.00001 to 0.001. Trial (C) increases the convergence trials from 50 to 1000. Trial (D) increases the over fit detection "Max steps w/o change" from 10 to 250. Trial (E) further increases the over fit detection "Max steps w/o change" to 500. Trial (F) further increases the over fit detection "Max steps w/o change" to 1000, Trial (G) increases the convergence trials, maximum iteration & iterations w/o improvement from 50 to 100, 10,000 to 100,000 and 500 to 10,0000 respectively, trial (H) increases the convergence trials, maximum iteration & iterations w/o improvement from 50 to 300, 10,000 to 1,000,000 and 500 to 200,0000 respectively, as shown by way of example in FIG. 24.

The definition of the internal structure of the MLP (i.e., number of hidden layers, number of neurons per layer, type of activation function) is generally a trial-and-error process. After having tested more MLP configurations with different numbers of hidden layers & different numbers of neurons for each level, the proper structure will be selected.

For testing the ANN model, the set of samples has been divided into two subsets: (1) the first one, composed of 80% of the samples, will be used as a training set (in order to adjust the weight of the connections and to store the knowledge); (2) the second one, composed of 20% of the samples, will be used as a validation set, in order to avoid the network over fitting problem (that occurs when the network fits very accurately the training data while results in a poor generalization on out-of sample data) during the learning phase. For each trial, an $R_2$ statistical parameter is calculated to gauge how each architecture trial compares with each other. The $R_2$ data is collected for each trial by each Wafer. The highest $R_2$ will then be chosen as the final MLP architecture to be compared with MLR model.

Modeling Using Multiple Linear Regression (MLR):

An MLR model expresses the relationship between the output variable (MCW) and the MCW drivers. If the expression is in the form of the equation below, the model is linear and the parameter a and $b_i$ could be easily derived using the method of least squares. MCW=a+$b_i$(weight)+$b_2$(Overlay_1)+$b_3$(Overlay_2)+$b_4$(R/W Offset)+$b_5$(Final SH).

Hence, using the well-assessed theory of multiple linear regression, it is possible to model the relationship between two or more explanatory variables and a response variable by fitting a linear equation to the observed data. The major drawback of this method is that often the real relationship between different variables is not linear, so the linear regression could provide only an approximation of the real relation. Due to the fact that the MLR assumed so far is linear, it is reasonable to suppose that the application of a nonlinear model, like an ANN, could provide even better results. Multiple Linear Regression modeling is straightforward, especially using standard statistical software. JMP software can be used to derive the MCW model predictability in terms of $R_2$ per Wafer. JMP processing models one or more continuous responses in the usual way through fitting a linear model by least squares. After obtaining the final Artificial Neural Network model using backprogapation algorithm, the ANN model is then used to predict the actual MCW. An $R_2$ will be derived after using the final model to predict MCW. The same is also done with MLR method. The $R_2$ value for the predicted MCW vs. actual MCW and its scatter plot for the ANN and MLR are then compared side by side. The model with higher $R_2$ (higher MCW predictability) will be the gauge for identification of the best model.

ANN Multilayer Percepton Architecture Optimization

Figure 25:
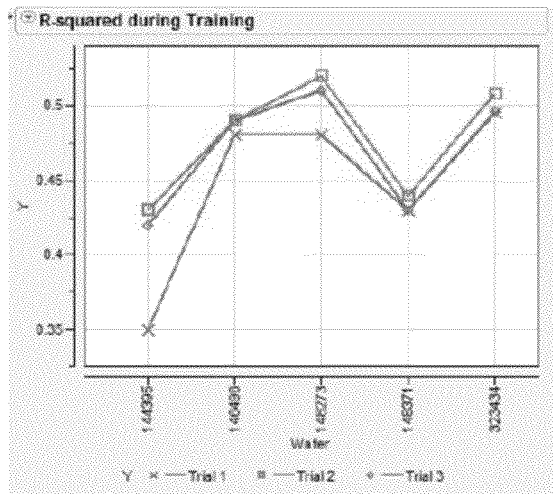
FIG. 25 is a graph illustrating $R^2$ values during Multi-Layer Perceptron training.

The graph of FIG. 25 shows comparison of $R_2$ values for Step 1 Trial 1, 2 & 3. Trial 1 has two hidden layer consisting of 20 neurons. Trial 2 has only one hidden layer consisting of 20 neurons. On the other hand, Trial 3 has one hidden layer but automatic neuron optimization was used.

Data shows that one hidden layer is enough to have high MCW predictability as compared with using two hidden layers. Also, using only 3 layers, there is no difference between automatic optimization vs. Manual setting using 20 neurons. It can be noted also that Trial 2 with 20 neurons had the highest $R_2$ which was obtained consistently for all wafers.

Figure 26:
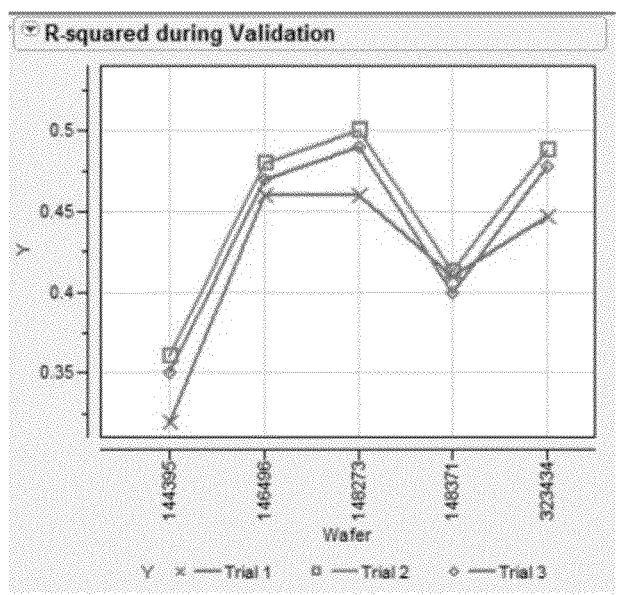
FIG. 26 is a graph illustrating $R^2$ values during Multi-Layer Perceptron Validation.

The graph of FIG. 26 shows comparison of $R_2$ values for Trial 1, 2 & 3 during validation. Trial 1 shows lowest $R_2$ during validation which is indicative of over fitting of data during training using 2 hidden layers. Consistently, Trial 2 with one hidden layer and 20 neurons showed highest $R_2$ values for validation, indicative of achieving the global minima of the system.

Figure 27:
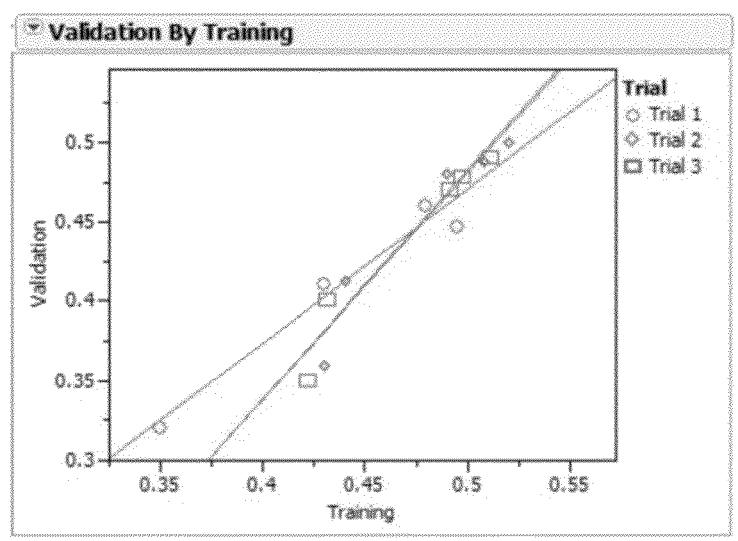
FIG. 27 is a graph showing $R^2$ values for Training vs. Validation.
Figure 28:
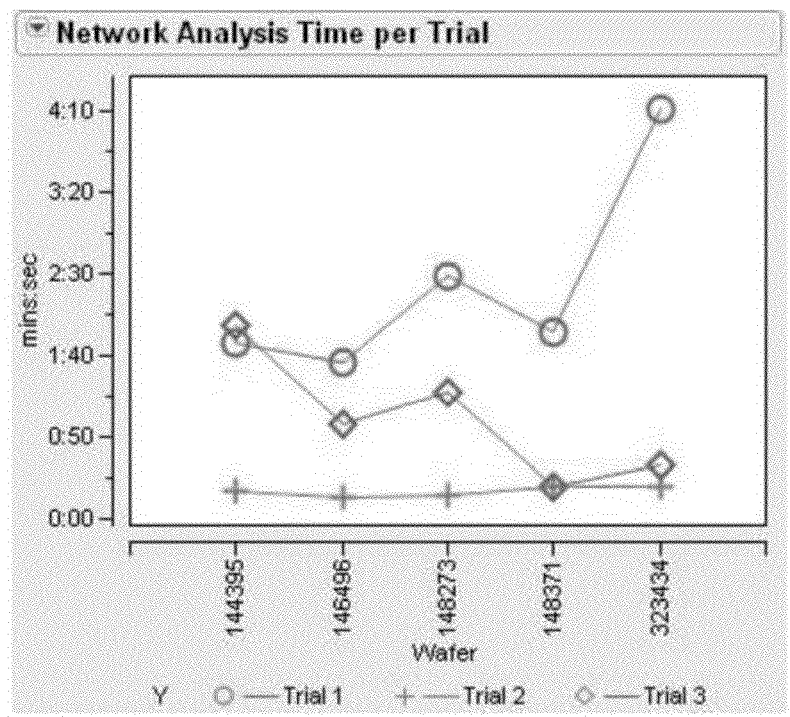
FIG. 28 is a graph illustrating Network Analysis Time per Network Architecture Trial.

The graph on FIG. 27 shows that Trial 1 has poor training and validation $R_2$ performance as compared with Trial 2 & 3. FIG. 28 shows the time required for the program to converge to a minima. Trial 1 having two hidden layers shows longest time to perform the analysis. Also, Trial 1 had the most erratic network learning time. Trial 2 with 3 layers and a fixed number of neurons showed the most consistent and stable calculation time to converge to a minima.

Considering the $R_2$ values achieved during Training & Validation and the speed to converge to a minima, the Trial 2 Multilayer Perceptron Architecture with 3 layers and 20 neurons for the hidden layer is chosen to proceed to the 2nd step simulations.

To predict and model the final MCW requires the inclusion of complex parameters and interactions between Wafer and Slider Fabrication Process. The features of Artificial Neural Network for nonlinearity, auto-fitting transfer function, adaptivity and fault tolerance fits the category to provide a good & robust MCW prediction model.

The modeling results using current production data have shown that an ANN is better in all the validation samples than the Statistical model, without any significant variance problems (i.e., the dependence of the model on the data set used to construct it).

In a specific example of the method, an ANN Multilayer Perceptron architecture which had 3 layers and 20 neurons in the hidden layer was identified as the most appropriate ANN MLP architecture. Network training was also explored to reach maximum significant MCW predictability without excessively long network training time. A data set was formulated from Wafer, Slider and DET data that were used for ANN training & validation. Finally, the ANN model was compared with conventional MLR method and had shown that ANN gave better accuracy in predicting the final MCW than MLR by 30%.

Both models were observed to be affected by Wafer to Wafer variability for MCW prediction. It seems each Wafer has different characteristics and one may need to add additional factors to improve its predictability. In order to address this, one could Include and identify additional MCW factors and develop new ANN model to reach global minima for all Wafers and as well as to cope with individual Wafers unique MCW response. In addition, it could be useful to explore and develop other ANN architecture, techniques and transfer functions to improve MCW model predictability.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing magnetic heads for magnetic data recording, comprising:
   collecting data regarding manufacturing parameters;
   constructing a neural network;
   analyzing the data using the neural network to produce an output from the neural network; and
   using the output from the neural network to optimize a magnetic core width of a magnetic write head.

2. The method as in claim 1, wherein the data includes: a write pole flare point; a wrap around shield dimension; and a side gap.

3. The method as in claim 2 wherein the data includes a magnetic sensor stripe height and a reader/writer offset.

4. The method as in claim 1 further comprising adjusting the manufacturing parameters based on the output from the neural network to optimize the magnetic core width.

5. The method as in claim 1 wherein the neural network comprises a multi-layer network of a plurality of perceptrons.

6. The method as in claim 1 wherein the neural network comprises a multi-layer model having an input layer at least one hidden layer and an output layer.

7. The method as in claim 1 wherein the neural network comprises a feed forward neural network.

8. The method as, in claim 1 wherein the neural network comprises a plurality of feed forward neural networks.

9. The method as in claim 1 wherein the neural network includes a perceptron.

10. The method as in claim 1 wherein the neural network includes a multilayer perceptron.

11. The method as in claim 1 wherein the neural network includes a feed forward multi-layer perceptron.

12. A non-transitory computer readable medium comprising instructions for:
    collecting data regarding manufacturing parameters;
    constructing a neural network;
    analyzing the data using the neural network to 1oroduce an output from the neural network; and
    using the output from the neural network to provide new manufacturing parameters for optimizing a magnetic core width of a write head.

13. The method as in claim 12, wherein the data includes: a write pole flare point; a wrap around shield dimension; and a side gap.

14. The method as in claim 13 wherein the data includes a magnetic sensor stripe height and a reader/writer offset.

15. The method as in claim 12 wherein the neural network comprises a multi-layer network of a plurality of perceptrons.

16. The method as in claim 12 wherein the neural network comprises a multi-layer model having an input layer at least one hidden layer and an output layer.

17. The method as in claim 12 wherein the neural network comprises a feed forward neural network.

18. The method as in claim 12 wherein the neural network comprises a plurality of feed forward neural networks.

19. The method as in claim 12 wherein the neural network includes a perceptron.

20. The method as in claim 12 wherein the neural network includes a multilayer perceptron.

* * * * *

UNITED STATES PATENT AND TRADEMARK OFFICE
CERTIFICATE OF CORRECTION

| | |
|---|---|
| PATENT NO. | : 8,521,670 B2 |
| APPLICATION NO. | : 13/115884 |
| DATED | : August 27, 2013 |
| INVENTOR(S) | : Hernan J. S. Paguio |

Page 1 of 1

It is certified that error appears in the above-identified patent and that said Letters Patent is hereby corrected as shown below:

In the claims:

col. 22, line 23, please replace "1oroduce" with --produce--.

Signed and Sealed this
Twenty-fourth Day of June, 2014

Michelle K. Lee
*Deputy Director of the United States Patent and Trademark Office*